(12) United States Patent
Kodaka

(10) Patent No.: US 8,429,354 B2
(45) Date of Patent: Apr. 23, 2013

(54) FIXED LENGTH MEMORY BLOCK MANAGEMENT APPARATUS AND METHOD FOR ENHANCING MEMORY USABILITY AND PROCESSING EFFICIENCY

(75) Inventor: Takeshi Kodaka, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1110 days.

(21) Appl. No.: 12/358,370

(22) Filed: Jan. 23, 2009

(65) Prior Publication Data

US 2009/0193212 A1  Jul. 30, 2009

(30) Foreign Application Priority Data

Jan. 30, 2008 (JP) .................................. 2008-018788

(51) Int. Cl.
*G06F 12/00* (2006.01)
*G06F 13/00* (2006.01)
*G06F 13/28* (2006.01)

(52) U.S. Cl.
USPC ................... 711/147; 711/163; 711/E12.091; 711/E12.093

(58) Field of Classification Search .......... None
See application file for complete search history.

(56) References Cited

U.S. PATENT DOCUMENTS

| 5,060,144 | A | * | 10/1991 | Sipple et al. | 710/200 |
|---|---|---|---|---|---|
| 5,293,577 | A | * | 3/1994 | Hueske et al. | 705/65 |
| 5,404,478 | A | * | 4/1995 | Arai et al. | 711/206 |
| 6,175,900 | B1 | * | 1/2001 | Forin et al. | 711/156 |
| 6,353,829 | B1 | * | 3/2002 | Koblenz et al. | 1/1 |
| 6,490,662 | B1 | * | 12/2002 | Pong et al. | 711/152 |
| 6,718,451 | B2 | | 4/2004 | Lawton et al. | |
| 6,922,744 | B1 | * | 7/2005 | Sipple et al. | 710/200 |
| 6,986,003 | B1 | * | 1/2006 | Sipple et al. | 711/145 |
| 7,203,812 | B2 | * | 4/2007 | Kadohiro | 711/171 |
| 7,516,291 | B2 | * | 4/2009 | van Riel et al. | 711/170 |
| 7,844,665 | B2 | * | 11/2010 | Holt | 709/205 |

(Continued)

FOREIGN PATENT DOCUMENTS

| JP | 2-162439 A | 6/1990 |
|---|---|---|
| JP | 8-221317 | 8/1996 |
| JP | 2000-78624 A | 3/2000 |
| JP | 2000-285011 A | 10/2000 |

OTHER PUBLICATIONS

Office Action issued Jul. 20, 2012 in Japanese Patent Application No. 2008-018788 with English language translation 8 pages.
Office Action issued Feb. 15, 2013, in Japanese Patent Application No. 2008-018788, filed Jan. 30, 2008 (with English-language Translation), 9pages.

*Primary Examiner* — Edward Dudek, Jr.
*Assistant Examiner* — Matthew Chrzanowski
(74) *Attorney, Agent, or Firm* — Oblon, Spivak, McClelland, Maier & Neustadt, L.L.P.

(57) ABSTRACT

A fixed length memory block management apparatus has a plurality of processors which execute applications, a memory which is shared by the plurality of processors, an application program, an initialization program, and an access right allocation program being stored in the memory. The apparatus has an application execution unit which starts up the application program to execute the application, an initialization unit which starts up the initialization program to set a memory block management area including a plurality of sub-blocks at the memory, and an access right allocation unit which starts up the access right allocation program to allocate an access right of a memory block of the sub-block set by the initialization unit to the application execution unit.

12 Claims, 9 Drawing Sheets

U.S. PATENT DOCUMENTS

| | | | |
|---|---|---|---|
| 7,930,694 B2 * | 4/2011 | Anderson et al. | 718/100 |
| 2001/0018731 A1 | 8/2001 | Fujii et al. | |
| 2003/0204682 A1 * | 10/2003 | Ueno | 711/147 |
| 2003/0208662 A1 * | 11/2003 | Heisch | 711/152 |
| 2004/0030842 A1 * | 2/2004 | Cypher | 711/145 |
| 2005/0246506 A1 * | 11/2005 | Ukai | 711/152 |
| 2007/0283125 A1 * | 12/2007 | Manczak et al. | 711/207 |
| 2008/0120477 A1 * | 5/2008 | Holt | 711/150 |
| 2008/0250213 A1 * | 10/2008 | Holt | 711/159 |
| 2009/0193220 A1 * | 7/2009 | Nonogaki | 711/171 |

* cited by examiner

| SUB-BLOCK 1 | | |
|---|---|---|
| EXCLUSIVE ACCESS CONTROL RIGHT MEMORY BLOCK | 0xXXXX0000 | |
| FIRST OFFSET MEMORY BLOCK | 0xXXXX0001 | 2 |
| SECOND OFFSET MEMORY BLOCK | 0xXXXX0002 | 3 |
| ALLOCATION MEMORY BLOCK 1 | 0xXXXX0003 | 4 |
| ⋮ | ⋮ | ⋮ |
| ALLOCATION MEMORY BLOCK m | 0xXXXX00ff | NULL |

| SUB-BLOCK 2 | | |
|---|---|---|
| EXCLUSIVE ACCESS CONTROL RIGHT MEMORY BLOCK | 0xXXXX0100 | |
| FIRST OFFSET MEMORY BLOCK | 0xXXXX0101 | −1 |
| SECOND OFFSET MEMORY BLOCK | 0xXXXX0102 | 3 |
| ALLOCATION MEMORY BLOCK 1 | 0xXXXX0103 | 4 |
| ⋮ | ⋮ | ⋮ |
| ALLOCATION MEMORY BLOCK m | 0xXXXX01ff | NULL |

| SUB-BLOCK n | | |
|---|---|---|
| EXCLUSIVE ACCESS CONTROL RIGHT MEMORY BLOCK | 0xXXXX0200 | |
| FIRST OFFSET MEMORY BLOCK | 0xXXXX0201 | −1 |
| SECOND OFFSET MEMORY BLOCK | 0xXXXX0202 | 3 |
| ALLOCATION MEMORY BLOCK 1 | 0xXXXX0203 | 4 |
| ⋮ | ⋮ | ⋮ |
| ALLOCATION MEMORY BLOCK m | 0xXXXX02ff | NULL |

FIG. 4

SUB-BLOCK 1

| | | |
|---|---|---|
| EXCLUSIVE ACCESS CONTROL RIGHT MEMORY BLOCK | 0xXXXX0000 | |
| FIRST OFFSET MEMORY BLOCK | 0xXXXX0001 | 2 |
| SECOND OFFSET MEMORY BLOCK | 0xXXXX0002 | 3 →4 |
| ALLOCATION MEMORY BLOCK 1 | 0xXXXX0003 | 4 →ALLOCATED |
| ⋮ | ⋮ | ⋮ |
| ALLOCATION MEMORY BLOCK m | 0xXXXX00ff | NULL |

SUB-BLOCK 2

| | | |
|---|---|---|
| EXCLUSIVE ACCESS CONTROL RIGHT MEMORY BLOCK | 0xXXXX0100 | |
| FIRST OFFSET MEMORY BLOCK | 0xXXXX0101 | -1 |
| SECOND OFFSET MEMORY BLOCK | 0xXXXX0102 | 5 |
| ALLOCATION MEMORY BLOCK 1 | 0xXXXX0103 | ALLOCATED |
| ⋮ | ⋮ | ⋮ |
| ALLOCATION MEMORY BLOCK m | 0xXXXX01ff | NULL |

SUB-BLOCK n

| | | |
|---|---|---|
| EXCLUSIVE ACCESS CONTROL RIGHT MEMORY BLOCK | 0xXXXX0200 | |
| FIRST OFFSET MEMORY BLOCK | 0xXXXX0201 | -1 |
| SECOND OFFSET MEMORY BLOCK | 0xXXXX0202 | 3 |
| ALLOCATION MEMORY BLOCK 1 | 0xXXXX0203 | 4 |
| ⋮ | ⋮ | ⋮ |
| ALLOCATION MEMORY BLOCK m | 0xXXXX02ff | NULL |

FIG. 6A

SUB-BLOCK 1

| EXCLUSIVE ACCESS CONTROL RIGHT MEMORY BLOCK | 0xXXXX0000 | |
|---|---|---|
| FIRST OFFSET MEMORY BLOCK | 0xXXXX0001 | 2 |
| SECOND OFFSET MEMORY BLOCK | 0xXXXX0002 | NULL |
| ALLOCATION MEMORY BLOCK 1 | 0xXXXX0003 | ALLOCATED |
| ⋮ | ⋮ | ⋮ |
| ALLOCATION MEMORY BLOCK m | 0xXXXX00ff | ALLOCATED |

SUB-BLOCK 2

| EXCLUSIVE ACCESS CONTROL RIGHT MEMORY BLOCK | 0xXXXX0100 | |
|---|---|---|
| FIRST OFFSET MEMORY BLOCK | 0xXXXX0101 | -1 |
| SECOND OFFSET MEMORY BLOCK | 0xXXXX0102 | 5 |
| ALLOCATION MEMORY BLOCK 1 | 0xXXXX0103 | ALLOCATED |
| ⋮ | ⋮ | ⋮ |
| ALLOCATION MEMORY BLOCK m | 0xXXXX01ff | NULL |

SUB-BLOCK N

| EXCLUSIVE ACCESS CONTROL RIGHT MEMORY BLOCK | 0xXXXX0200 | |
|---|---|---|
| FIRST OFFSET MEMORY BLOCK | 0xXXXX0201 | -1 |
| SECOND OFFSET MEMORY BLOCK | 0xXXXX0202 | 3 |
| ALLOCATION MEMORY BLOCK 1 | 0xXXXX0203 | 4 |
| ⋮ | ⋮ | ⋮ |
| ALLOCATION MEMORY BLOCK m | 0xXXXX02ff | NULL |

FIG. 6B

| SUB-BLOCK 1 | | |
|---|---|---|
| EXCLUSIVE ACCESS CONTROL RIGHT MEMORY BLOCK | 0xXXXX0000 | 1 |
| FIRST OFFSET MEMORY BLOCK | 0xXXXX0001 | 2 |
| SECOND OFFSET MEMORY BLOCK | 0xXXXX0002 | 4 →3 |
| ALLOCATION MEMORY BLOCK 1 (RELEASE MEMORY BLOCK) | 0xXXXX0003 | ALLOCATED →4 |
| ... | ... | ... |
| ALLOCATION MEMORY BLOCK m | 0xXXXX00ff | NULL |

FIG. 8

FIXED LENGTH MEMORY BLOCK MANAGEMENT APPARATUS AND METHOD FOR ENHANCING MEMORY USABILITY AND PROCESSING EFFICIENCY

CROSS-REFERENCE TO RELATED APPLICATION

This application is based upon and claims the benefit of priority from the prior Japanese Patent Application No. 2008-18788, filed on Jan. 30, 2008; the entire contents of which are incorporated herein by reference.

BACKGROUND OF THE INVENTION

1. Field of the Invention

The present invention relates to a fixed length memory block management apparatus and a control method thereof, particularly to a fixed length memory block management apparatus provided with a multiprocessor and a method for controlling the fixed length memory block management apparatus.

2. Related Art

Recently, there is known a multiprocessor system in which a multiprocessor architecture including plural processors and a memory is adopted.

In the multiprocessor architecture, it is necessary that about one byte of small memory block be dynamically allocated as an exclusive control memory area in which a test and set command is used.

In the conventional multiprocessor system, the allocated memory block is set to a fixed length, a set of "an exclusive control memory area" and "a pointer to a head of an unused area" and a set of "a pointer to a next unused area" and "a current status of a memory area allocated to an application" are set as the memory block management area, and the fixed length memory block allocated to the application is managed by a link list connected to the pointer of the unused area.

However, in such multiprocessor systems, because a memory block management area is set every memory block allocated to the application, a memory address which cannot be stored in about one byte of small memory block is set in the memory block, unfortunately memory space efficiency is lowered.

On the other hand, Japanese Patent Publication Laid-Open No. 8-221317 discloses a fixed length memory block management method in which management is performed using a bitmap.

However, in the fixed length memory block management method disclosed in Japanese Patent Publication Laid-Open No. 8-221317, because an empty area is searched using the bitmap, it takes a long time to perform memory block allocation processing, unfortunately multiprocessor system processing efficiency is lowered.

On the other hand, in the conventional multiprocessor system, each processor acquires an exclusive access right (hereinafter referred to as "lock") of a memory block management area in order to prevent the plural processors simultaneously access the memory block.

However, in such multiprocessor systems, the lock is acquired with respect to the whole of the memory block management area. Therefore, in the case where the lock is acquired by one of the processors, the other processor stands firm until the lock is released, which results in a problem in that multiprocessor system processing efficiency is lowered.

Additionally, in such multiprocessor systems, a starting address of the memory block management area is not decided when the memory block management area is dynamically ensured, and it is necessary to set the memory block management area again when the memory block is released. Therefore, the number of setting items is increased on the application side, which results in a problem in that a load on the application is increased.

BRIEF SUMMARY OF THE INVENTION

According to a first aspect of the present invention, there is provided a fixed length memory block management apparatus comprising:

a plurality of processors which execute applications; and a memory which is shared by the plurality of processors, an application program, an initialization program, and an access right allocation program being stored in the memory, wherein each processor includes:

application execution unit which starts up the application program to execute the application;

initialization unit which starts up the initialization program to set a memory block management area including a plurality of sub-blocks in the memory; and access right allocation unit which starts up the access right allocation program to allocate an access right of a memory block of the sub-block set by the initialization unit to the application execution unit.

According to a second aspect of the present invention, there is provided a method for controlling a fixed length memory block management apparatus of a multiprocessor system including a plurality of processors which execute an applications and a memory which is shared by the plurality of processors, the method comprising:

setting a memory block management area including a plurality of sub-blocks in the memory;

acquiring an exclusive access control right of a predetermined sub-block in the plurality of sub-blocks; and allocating an access right of a memory block of the sub-block to the application.

BRIEF DESCRIPTION OF THE DRAWINGS

FIG. 4 is a schematic diagram showing a configuration of a memory block management area set in the initialization processing of the first embodiment of the present invention.

FIG. 6 is a schematic diagram showing a configuration of a memory block management area set in the access right allocation processing of the first embodiment of the present invention.

FIG. 8 is a schematic diagram showing a configuration of a memory block management area set in the access right release processing of the first embodiment of the present invention.

DETAILED DESCRIPTION OF THE INVENTION

An embodiment of the present invention will be described below with reference to the drawings. The following embodiment is described only by way of example, and the present invention is not limited to the embodiment.

First Embodiment

A first embodiment of the present invention will be described below.

A configuration of a fixed length memory block management apparatus 100 according to the first embodiment of the present invention will be described.

Figure 1:
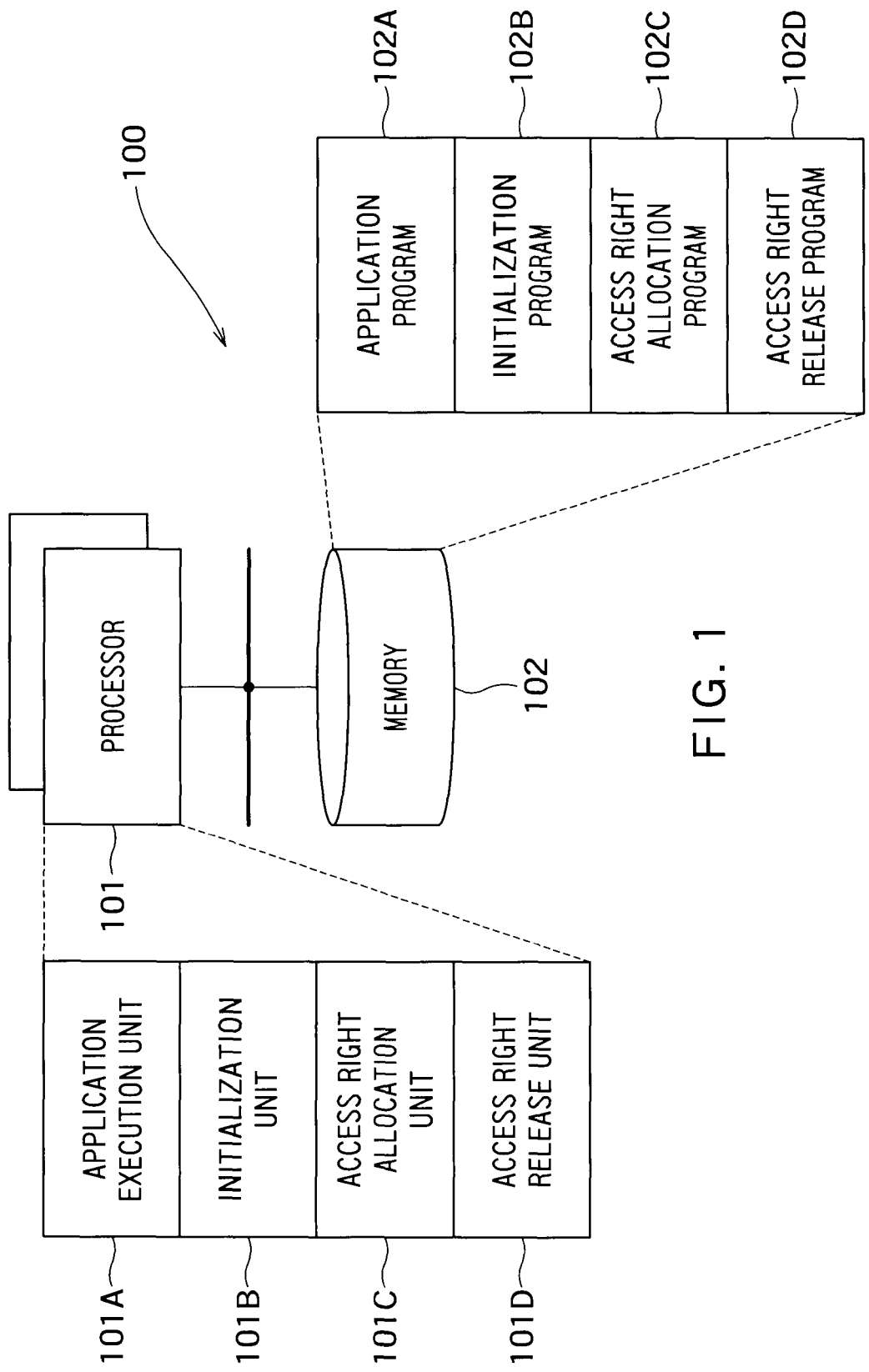
FIG. 1 is a block diagram showing the configuration of the fixed length memory block management apparatus 100 of the first embodiment of the present invention.

FIG. 1 is a block diagram showing the configuration of the fixed length memory block management apparatus 100 of the first embodiment of the present invention.

The fixed length memory block management apparatus 100 of the first embodiment of the present invention includes plural processors 101 and a memory 102.

Each of the processors 101 starts up an application program 102A in the memory 102 to realize an application execution unit 101A, starts up an initialization program 102B in the memory 102 to realize an initialization unit 101B, starts up an access right allocation program 102C in the memory 102 to realize an access right allocation unit 101C, and starts up an access right release program 102D in the memory 102 to realize an access right release unit 101D. The processors 101 have unique pieces of processor identifying information P0 to Px, respectively.

The application execution unit 101A executes an application for performing predetermined processing according to the application program 102A.

The initialization unit 101B performs initialization processing for setting a memory block management area including plural sub-blocks in the memory 102 according to the initialization program 102B.

The access right allocation unit 101C performs access right allocation processing for allocating an access right of a memory block to the application execution unit 101A according to the access right allocation program 102C.

The access right release unit 101D performs access right release processing for releasing the access right of the memory block designated by the application execution unit 101A according to the access right release program 102D.

The memory 102 is shared by each of the processors 101. The application program 102A, the initialization program 102B, the access right allocation program 102C, and the access right release program 102D are stored in the memory 102. The memory 102 also acts as a working memory of the processor 101.

Figure 2:
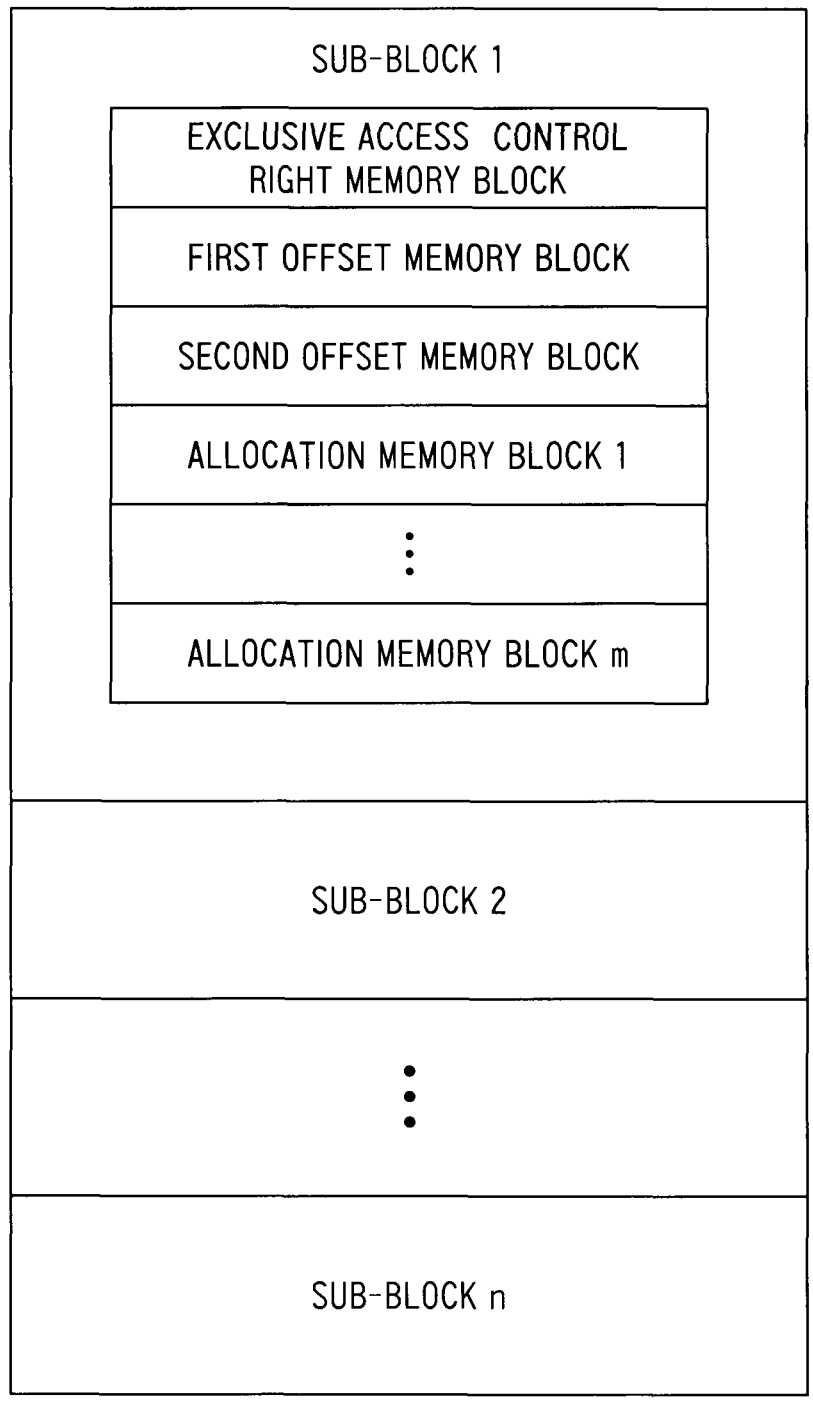
FIG. 2 is a schematic diagram showing a configuration of a memory block management area set in the memory 102 of the first embodiment of the present invention.

FIG. 2 is a schematic diagram showing a configuration of a memory block management area set in the memory 102 of the first embodiment of the present invention.

The memory block management area includes plural sub-blocks 1 to n set in continuous memory areas. For example, each sub-block has a capacitance (hereinafter referred to as "sub-block size") of 256 bytes.

In each of the sub-blocks 1 to n, an integral multiple of the sub-block size designated by the application execution unit 101A is set as a starting address. Each of the sub-blocks 1 to n includes an exclusive access control right memory block, a first offset memory block, a second offset memory block, and plural allocation memory blocks 1 to m. For example, each memory block has a capacitance (hereinafter referred to as "memory block size") of one byte.

The exclusive access control right memory block is a memory block in which a value indicating whether or not an exclusive access control right is granted is set. When the value (for example, "1") indicating that the exclusive access control right is granted to the exclusive access control right memory block of the sub-block 1 is set, the exclusive access control right of the sub-block is granted to any one of unit 101A to 101D of each processor 101. An access is permitted to only one of the unit 101A to 101D of the processor 101 acquiring the exclusive access control right while the exclusive access control right is granted.

The first offset memory block is a memory block in which an offset (hereinafter referred to as "first offset") to the starting address of the next sub-block is set.

The second offset memory block is a memory block in which an offset (hereinafter referred to as "second offset") to the starting address of the memory block where the access right is not allocated to the application execution unit 101A is set.

The allocation memory blocks 1 to m are memory blocks accessed by the application execution unit 101A to which the access right is allocated.

An operation of the fixed length memory block management apparatus 100 of the first embodiment of the present invention will be described below. In the first embodiment of the present invention, the fixed length memory block management apparatus 100 includes three processors 101 (P0 to P2), the sub-block size is 256 bytes, and the memory block size is 1 byte.

Figure 3:
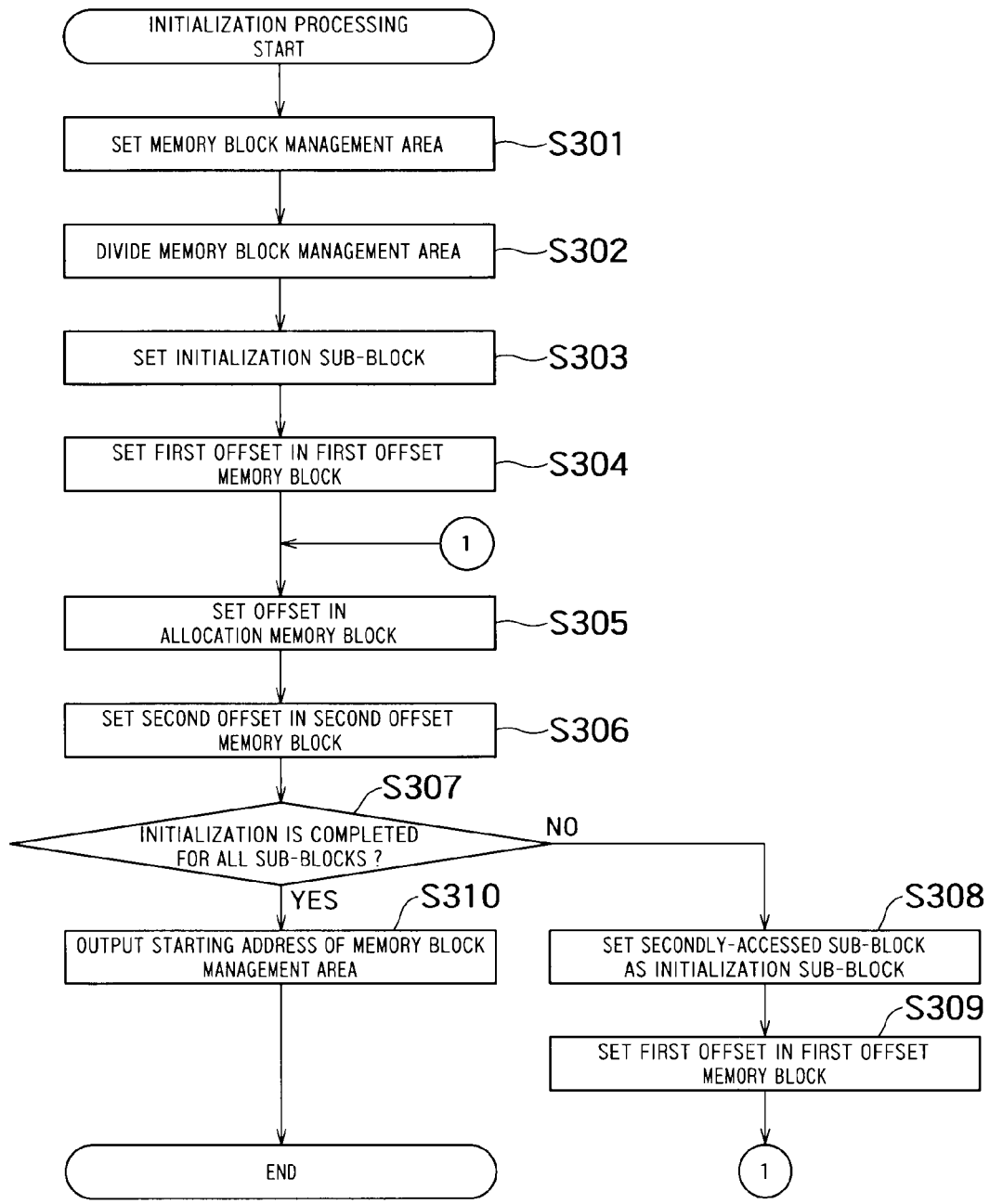
FIG. 3 is a flowchart showing a procedure of initialization processing according to the first embodiment of the present invention.

FIG. 3 is a flowchart showing a procedure of initialization processing according to the first embodiment of the present invention.

The initialization unit 101B performs the initialization processing of the first embodiment of the present invention after the application execution unit 101A designates the number of sub-blocks and the sub-block size. The case where the application execution unit 101A designates the three sub-blocks will be illustrated below.

The initialization unit 101B performs an integral multiple of the sub-block size designated by the application execution unit 101A. Then, the initialization unit 101B sets the integral multiple value as the starting address. Then, the initialization unit 101B sets an area (hereinafter referred to as "memory block management area") in a range of the starting address to the number of sub-blocks designated by the application execution unit 101A in the memory 102 (S301). In the first embodiment of the present invention, as shown in FIG. 4, the integral multiple of the sub-block size 256 (for example, "0xXXXX0000") is set as the starting address, and the area from the starting address to 256x3=768 bytes is set as the memory block management area.

The initialization unit 101B divides the memory block management area set in S301 by the number of sub-blocks designated by the application execution unit 101A to set the plural sub-blocks 1 to n (S302). At this point, the initialization unit 101B sets unique pieces of sub-block identifying information S1 to Sn in the sub-blocks 1 to n, respectively. A first offset memory block, a second offset memory block, and allocation memory blocks 1 to m are set at each of the sub-blocks 1 to n (S1 to Sn). The first offset to the starting address of the secondly-accessed sub-block is stored in the first offset memory block. The second offset to the starting address of the memory block, which is not allocated to the application execution unit 101A, is stored in the second offset memory block. The offset to the next allocation memory block are stored in the allocation memory blocks. In the first embodiment of the present invention, as shown in FIG. 4, the memory block management area is divided into the sub-blocks 1 to 3, and the sub-blocks 1 to 3 (S1 to S3) are set.

The initialization unit 101B sets the initialization sub-block (S303). In the first embodiment of the present invention, as shown in FIG. 4, the head sub-block 1 is set as the initialization sub-block.

The initialization unit 101B sets the first offset having a sub-block size unit to the starting address of the secondly-accessed sub-block in the first offset memory block of the initialization sub-block set in S303 (S304). In the first embodiment of the present invention, as shown in FIG. 4, the first offset of "2" to the starting address of the sub-block 3(S3) is set in the first offset memory block of the sub-block 1.

The initialization unit 101B sets the offset having a memory block size unit to the starting address of the next memory block from the head address of the initialization sub-block in all the allocation memory blocks 1 to m of the initialization sub-block (S305). At this point, "NULL" is set in the allocation memory block m at an end of the initialization sub-block. In the first embodiment of the present invention, values of "4" to "255" are set in the allocation memory blocks 1 to 252 of the sub-block 1, and the value of "NULL" is set in the allocation memory block 253 of the sub-block 1.

The initialization unit 101B sets an offset (hereinafter referred to as "second offset") to a starting address of a head unallocated memory block from the starting address of the initialization sub-block in allocation memory blocks (hereinafter referred to as "unallocated memory blocks") in which the access right is not allocated in the second offset memory block of the initialization sub-block (S306). In the first embodiment of the present invention, as shown in FIG. 4, the value of "3" is set in the second offset memory block of the sub-block 1(S1).

When the initialization is not completed for all the sub-blocks (NO in S307), the initialization unit 101B sets the secondly-accessed sub-block as the initialization sub-block (S308). In the first embodiment of the present invention, as shown in FIG. 4, the sub-block 3 (S3) is set as the initialization block.

The initialization unit 101B sets the first offset having the sub-block size unit in the first offset memory block of the initialization sub-block set in S308 (S309). Then, the flow goes to S305. In the first embodiment of the present invention, as shown in FIG. 4, the first offset of "−1" to the starting address of the immediately preceding sub-block 2(S2) in the first offset memory block of the sub-block 3.

On the other hand, when the initialization is completed for all the sub-blocks (YES in S307), the starting address of the memory block management area is output to the application execution unit 101A (S310). In the first embodiment of the present invention, as shown in FIG. 4, when the initialization of the sub-block 2(S2) is completed after the initialization of the sub-block 3(S3), the address of "0xXXXX0000" is output.

Then, the initialization processing of the first embodiment of the present invention is completed.

Figure 5:
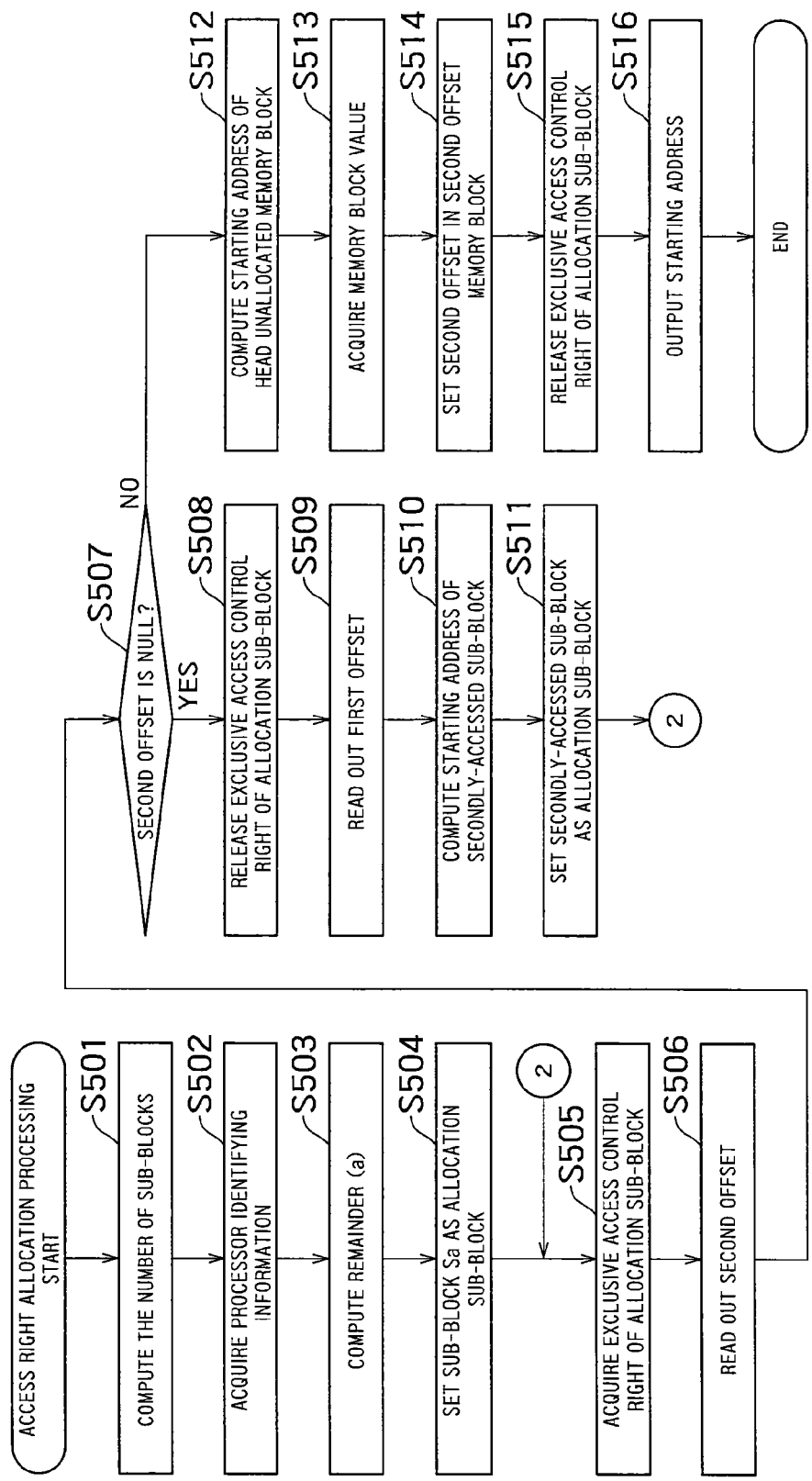
FIG. 5 is a flowchart showing a procedure of access right allocation processing according to the first embodiment of the present invention.

FIG. 5 is a flowchart showing a procedure of access right allocation processing according to the first embodiment of the present invention.

The access right allocation unit 101C performs the access right allocation processing according to the first embodiment of the present invention after the initialization processing. In the first embodiment of the present invention, the case where the processor 101(P1) having identifying information P1 realizes the access right allocation unit 101C will be illustrated.

The access right allocation unit 101C computes the number of sub-blocks of the memory block management area (S501). In the first embodiment of the present invention, the number of sub-blocks of "3" in which "1" is added to the value of "2" of the first offset memory block of the head sub-block 1 is computed.

The access right allocation unit 101C acquires the identifying information of the processor 101 starting up the application program 102A (S502). In the first embodiment of the present invention, the identifying information P1 is acquired.

A remainder (a) in which a numerical portion of the processor identifying information acquired in S502 is divided by the number of sub-blocks computed in S501 is computed (S503). In the first embodiment of the present invention, a=1mod3=1 is computed.

The sub-block a(Sa) corresponding to the remainder a computed in S503 is set as the sub-block (hereinafter referred to as "allocation sub-block") initially accessed by the application execution unit 101A into the sub-block identifying information (S504). In the first embodiment of the present invention, the sub-block 1(S1) is set as the allocation sub-block.

The access right allocation unit 101C acquires the exclusive access control right of the allocation sub-block (S505). At this point, the access right allocation unit 101C sets a value (for example, "1") indicating that the exclusive access control right is granted in the exclusive access control right memory block of the allocation sub-block. In the first embodiment of the present invention, as shown in FIG. 6A, the value of "1" is set at the exclusive access control right memory block of the sub-block 1(S1).

Then, the access right allocation unit 101C reads out the second offset set in the second offset memory block of the allocation sub-block (S506).

In the first embodiment of the present invention, as shown in FIG. 6B, when the allocation is already performed for all the allocation memory blocks (allocation memory blocks 1 to 253) of the sub-block 1(S1), the value of "NULL" of the second offset memory block of the sub-block 1(S1) is read out.

That is, because the second offset read out in S506 is NULL (YES in S507), the access right allocation unit 101C releases the exclusive access control right of the allocation sub-block acquired in S505 (S508). At this point, the access right allocation unit 101C deletes the value set in the exclusive access control right memory block of the allocation sub-block.

The access right allocation unit 101C reads out the first offset set in the first offset memory block of the allocation sub-block (S509). In the first embodiment of the present invention, as shown in FIG. 6B, the value of "2" of the first offset memory block of the sub-block 1(S1) is read out.

The access right allocation unit 101C computes the starting address of the secondly-accessed sub-block (S510). In the first embodiment of the present invention, the starting address of "0xXXXX0200" of the sub-block 3(S3) is computed.

The access right allocation unit 101C sets the sub-block whose starting address is computed in S510 as the allocation sub-block (S511). Then, the flow goes to S505. In the first embodiment of the present invention, the sub-block 3(S3) is set as the allocation sub-block.

On the other hand, in the first embodiment of the present invention, as shown in FIG. 6A, when the allocation memory block 1 of the sub-block 1(S1) is unallocated, the value of "3" of the second offset memory block of the sub-block 1(S1) is read out in S506.

That is, because the second offset read out in S506 is not NULL (NO in S507), the access right allocation unit 101C computes the starting address of the head unallocated memory block using the starting address of the sub-block set as the allocation sub-block and the value of the second offset memory block read out in S506 (S512). In the first embodiment of the present invention, as shown in FIG. 6A, the starting address of "0xXXXX000" of the sub-block 1(S1) and the value of "3" of the second offset memory block of the sub-block 1(S1) are added to each other to compute an address of "0xXXXX0003"

The access right allocation unit 101C acquires the value of the unallocated memory block indicated by the starting address computed in S512 (S513). In the first embodiment of the present invention, as shown in FIG. 6A, the value of "4" of the allocation memory block 1 in which the starting address is the address of "0xXXXX0003" is acquired.

The access right allocation unit 101C sets the value of the unallocated memory block acquired in S513 in the second offset memory block of the allocation sub-block (S514). In the first embodiment of the present invention, as shown in FIG. 6A, the value of "4" is set in the second offset memory block of the sub-block 1(S1).

The access right allocation unit 101C releases the exclusive access control right of the allocation sub-block acquired in S505 (S508). At this point, the access right allocation unit 101C deletes the value set in the exclusive access control right memory block of the allocation sub-block.

The access right allocation unit 101C outputs the starting address computed in S512 to the application execution unit 101A (S516). In the first embodiment of the present invention, as shown in FIG. 6A, the address of "0xXXXX0003" is supplied to the application execution unit 101A.

Then, the access right allocation processing of the first embodiment is completed.

The access right allocation processing according to the first embodiment of the present invention may concurrently be performed by the plural processors 101 (P0 to Px).

Figure 7:
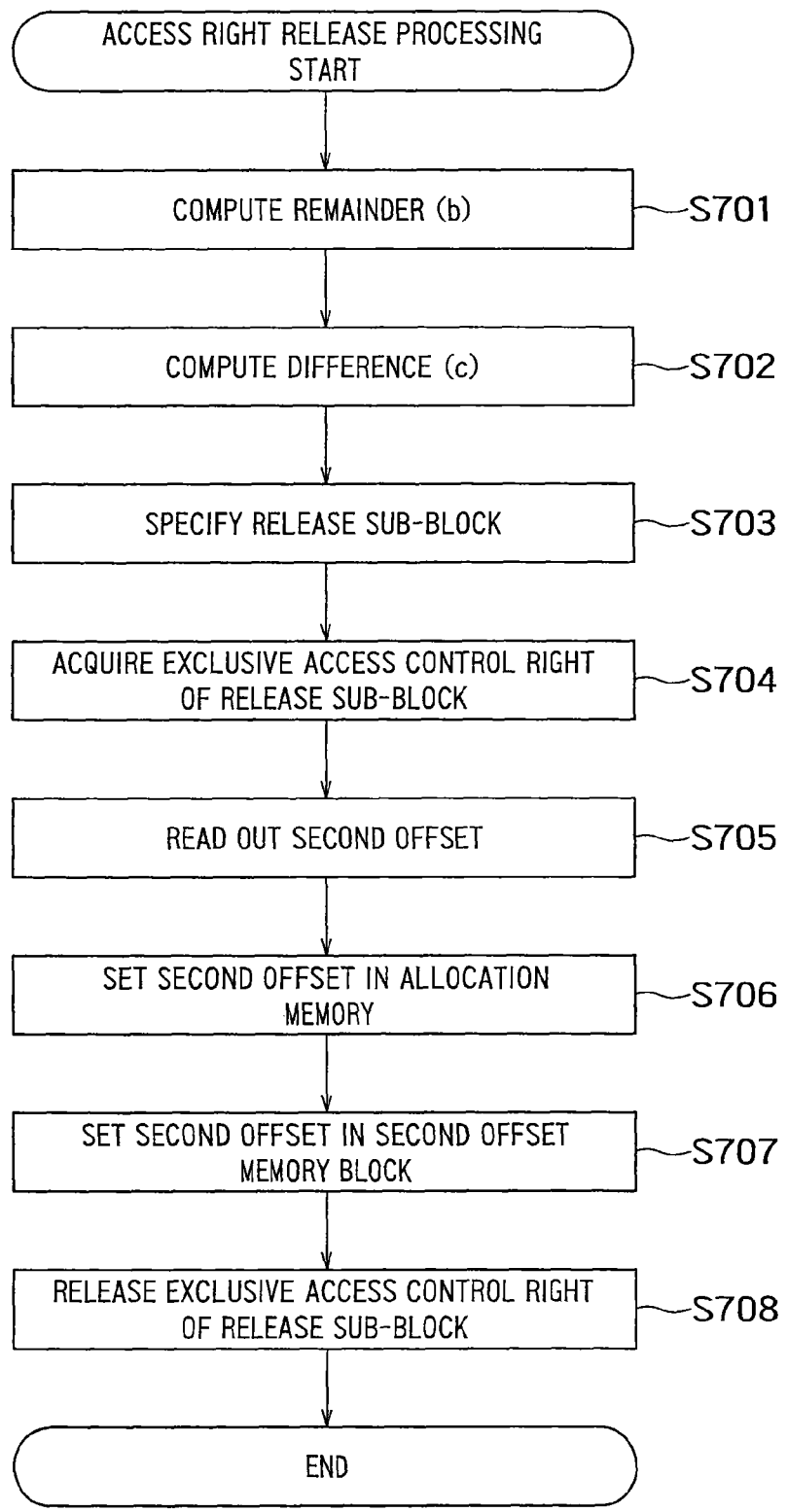
FIG. 7 is a flowchart showing a procedure of access right release processing according to the first embodiment of the present invention.

FIG. 7 is a flowchart showing a procedure of access right release processing according to the first embodiment of the present invention of the present invention.

The access right release unit 101D performs the access right release processing according to the first embodiment of the present invention after the execution of the application is completed. When the execution of the application is completed, the application execution unit 101A designates a starting address of a memory block (hereinafter referred to as "release memory block") in which the access right is released. In the first embodiment of the present invention, the case where the release memory block is the allocation memory block 1 of the sub-block 1(S1) will be illustrated.

The access right release unit 101D computes a remainder (b) in which the starting address of the release memory block is divided by the sub-block size (S701). In the first embodiment of the present invention, as shown in FIG. 8, b=0xXXXX0003mod256=3 is computed.

The access right release unit 101D computes a difference (c) between the starting address of the release memory block and the remainder (b) computed in S701 (S702). In the first embodiment of the present invention, as shown in FIG. 8, c=0xXXXX0003−3=0xXXXX000 is computed.

The access right release unit 101D specifies the sub-block whose difference (c) computed in S702 is the starting address as the release sub-block (S703). In the first embodiment of the present invention, as shown in FIG. 8, the sub-block 1(S1) is specified as the release sub-block.

The access right release unit 101D acquires the exclusive access control right of the release sub-block specified in S703 (S704). At this point, the access right release unit 101D sets a value (for example, "1") indicating that the exclusive access control right is granted in the exclusive access control right memory block of the release sub-block. In the first embodiment of the present invention, as shown in FIG. 8, the value of "1" is set in the exclusive access control right memory block of the sub-block 1(S1).

The access right release unit 101D reads out the second offset set in the second offset memory block of the release sub-block (S705). In the first embodiment of the present invention, as shown in FIG. 8, the value of "4" of the second offset memory block of the sub-block 1(S1) is read out.

The access right release unit 101D sets the second offset read out in S703 in the release memory block (S706). In the first embodiment of the present invention, as shown in FIG. 8, the value of "4" is set in the allocation memory block 1 of the sub-block 1(S1).

The access right release unit 101D computes an offset to the starting address of the release memory block from the starting address of the release sub-block to set the computed offset in the second offset memory block (S707). In the first embodiment of the present invention, as shown in FIG. 8, the value of "3" is set in the second offset memory block of the sub-block 1(S1).

The access right release unit 101D releases the exclusive access control right acquired in S704 (S708). At this point, the access right release unit 101D deletes the value set in the exclusive access control right memory block of the release sub-block.

Then, the access right release processing is completed after S708.

Alternatively, the access right release processing according to the first embodiment of the present invention may concurrently be performed by the plural processors 101 (P0 to Px).

According to the first embodiment of the present invention, the accesses of the processors 101 are dispersed by specifying the allocation memory block based on the processor identifying information. Therefore, a waiting time during which the exclusive access control right is set is shortened, and the memory space efficiency and the multiprocessor system processing efficiency can be improved without increasing the load on the application.

According to the first embodiment of the present invention, the offset to the starting address of the secondly-accessed unallocated memory block is set in the unallocated memory block. Therefore, the memory space efficiency can be improved.

According to the first embodiment of the present invention, the secondly-accessed allocation memory block is indicated by the offset from the starting address of the sub-block. Therefore, the secondly-accessed allocation memory block can be managed irrespective of the memory block size.

According to the first embodiment of the present invention, even if the same memory block management area are simultaneously accessed, the waiting time during which the exclusive access control right is set is not generated when the accessed sub-blocks are different from each other. Therefore, the multiprocessor system processing efficiency can be improved.

According to the first embodiment of the present invention, because the starting address of the sub-block has the integral multiple value of the sub-block size, the number of designated items of the application execution unit 101 can be decreased in the access right release processing, and therefore the memory space efficiency can be improved.

What is claimed is:

1. A fixed length memory block management apparatus comprising:
a plurality of processors configured to execute an application and share a memory,
wherein each processor comprises:
an application execution unit configured to execute the application;
an initialization unit configured to set a memory block management area comprising a plurality of sub-blocks in the memory; and
an access right allocation unit configured to allocate an access right of a memory block of the sub-blocks in the memory block management area to the application execution unit, wherein
in each sub-block, the initialization unit sets an exclusive access control right memory block in which the exclusive access control right is set, a first offset memory block in which a first offset to a starting address of a next sub-block to be accessed is stored, a second offset memory block in which a second offset to a starting address of a memory block which is not allocated to the application execution unit is stored, and an allocation memory block which is allocated to the application execution unit.

2. The apparatus of claim 1, wherein each processor has processor identifying information,
the initialization unit sets sub-block identifying information in each sub-block,
the access right allocation unit specifies a sub-block to be initially accessed from the sub-blocks according to the processor identifying information and the sub-block identifying information, and
acquires an exclusive access control right of the specified sub-block.

3. The apparatus of claim 1, wherein
the application execution unit designates a starting address of a memory block in which the access right is allocated, and
the processor further comprises an access right release unit configured to specify a sub-block according to the designated starting address, to acquire an exclusive access control right of the specified sub-block, and to release the access right of the memory block in which the access right is allocated.

4. The apparatus of claim 1, wherein the application execution unit designates a number of sub-blocks and a size of each sub-block, and
the initialization unit sets a memory block management area in a range of an integral multiple of the designated size to the designated number of sub-blocks at the memory.

5. The apparatus of claim 4, wherein the initialization unit divides the memory block management area into the designated number of sub-blocks to set a plurality of initialization sub-blocks.

6. The apparatus of claim 5, wherein the initialization unit sets the first offset which is a sub-block size unit at a first offset memory block of each initialization sub-block.

7. The apparatus of claim 5, wherein the initialization unit sets an offset which is a memory-block size unit to a starting address of a next memory block from a head address of each initialization sub-block at all the allocation memory blocks of the initialization sub-blocks.

8. A method for enhancing memory usability and processing efficiency in a multiprocessor system comprising a plurality of processors configured to execute an application and share a memory, the method comprising:
setting a memory block management area comprising a plurality of sub-blocks at the memory;
acquiring an exclusive access control right of a predetermined sub-block in the sub-blocks; and
allocating an access right of a memory block of the sub-block to the application, wherein
in each sub-block, an exclusive access control right memory block at which the exclusive access control right is set, a first offset memory block in which a first offset to a starting address of a next sub-block to be accessed is stored, a second offset memory block in which a second offset to a starting address of a memory block which is not allocated to the application execution unit is stored, and an allocation memory block which is allocated to the application execution unit is set.

9. The method of claim 8, wherein
each processor comprises processor identifying information,
sub-block identifying information is set at each sub-block,
a sub-block to be initially accessed from the sub-blocks according to the processor identifying information and the sub-block identifying information is specified, and
an exclusive access control right of the specified sub-block is acquired.

10. The method of claim 8, wherein a starting address of a memory block in which the access right is allocated is designated,
a sub-block according to the designated starting address is specified,
an exclusive access control right of the specified sub-block is acquired, and
an access right of the memory block in which the access right is allocated is released.

11. The method of claim 8, wherein a number of sub-blocks and a size of each sub-block are designated,
a memory block management area in a range of an integral multiple of the designated size to the designated number of sub-blocks at the memory is set.

12. The method of claim 11, wherein the memory block management area is divided into the designated number of sub-blocks to set a plurality of initialization sub-blocks.

* * * * *